(12) United States Patent
Xiao et al.

(10) Patent No.: US 12,183,026 B2
(45) Date of Patent: Dec. 31, 2024

(54) METHOD AND SYSTEM FOR DETECTING LONG-DISTANCE TARGET THROUGH BINOCULAR CAMERA, AND INTELLIGENT TERMINAL

(71) Applicant: Beijing Smarter Eye Technology Co. Ltd., Beijing (CN)

(72) Inventors: Zhipeng Xiao, Beijing (CN); Xinliang Wang, Beijing (CN); Feng Cui, Beijing (CN); Haifeng Lai, Beijing (CN)

(73) Assignee: Beijing Smarter Eye Technology Co. Ltd., Beijing (CN)

( * ) Notice: Subject to any disclaimer, the term of this patent is extended or adjusted under 35 U.S.C. 154(b) by 476 days.

(21) Appl. No.: 17/643,289

(22) Filed: Dec. 8, 2021

(65) Prior Publication Data
US 2022/0277470 A1    Sep. 1, 2022

(30) Foreign Application Priority Data

Feb. 26, 2021    (CN) .......................... 202110215340.6

(51) Int. Cl.
| | |
|---|---|
| *G06T 7/70* | (2017.01) |
| *G06T 7/10* | (2017.01) |
| *G06T 7/60* | (2017.01) |
| *G06V 10/25* | (2022.01) |

(52) U.S. Cl.
CPC .................. *G06T 7/70* (2017.01); *G06T 7/10* (2017.01); *G06T 7/60* (2013.01); *G06V 10/25* (2022.01); *G06T 2207/10012* (2013.01)

(58) Field of Classification Search
CPC .... G06T 7/70; G06T 7/10; G06T 7/60; G06T 2207/10012; G06V 10/25
See application file for complete search history.

(56) References Cited

FOREIGN PATENT DOCUMENTS

| CN | 107980138 A | * | 5/2018 | ......... G06K 9/00664 |
|---|---|---|---|---|
| CN | 112489186 A | * | 3/2021 | ............. G06T 17/00 |

* cited by examiner

*Primary Examiner* — Wednel Cadeau
(74) *Attorney, Agent, or Firm* — NKL Law; Allen Xue

(57) ABSTRACT

A method and a system for detecting a long-distance target through a binocular camera, and an intelligent terminal are provided. The method includes the steps of: acquiring original images generated by the binocular camera at a target region, acquiring a disparity map in accordance with the original images, and converting the disparity map into a space information point cloud map; partitioning a predetermined target detection range into a plurality of sub-ranges in accordance with the space information point cloud map, and acquiring a disparity threshold segmentation image for each sub-range; calculating an integral image in accordance with each disparity threshold segmentation image, and acquiring a heatmap of an obstacle in accordance with the integral images; and reversely mapping a maximum matching region in the heatmap to the original image, so as to acquire a target ROI for the obstacle, thereby to acquire a position of the obstacle.

9 Claims, 3 Drawing Sheets

METHOD AND SYSTEM FOR DETECTING LONG-DISTANCE TARGET THROUGH BINOCULAR CAMERA, AND INTELLIGENT TERMINAL

TECHNICAL FIELD

The present disclosure relates to the field of assistant driving technology, in particular to a method and a system for detecting a long-distance target through a binocular camera, and an intelligent terminal.

BACKGROUND

Recently, along with the development of the automatic driving technology and the assistant driving technology, a vehicle-mounted sensor is highly demanded. Especially, in the case of rapid iteration of a deep learning technology, a camera is indispensable for sensing an obstacle. The other sensors, e.g., millimeter-wave radar and laser radar, are capable of cooperating with the camera to provide a solution. A non-metal object is easily missed by the millimeter-wave radar. The laser radar needs to be mounted outside a vehicle body, so its cost is relatively high, a mechanical loss occurs, and it is difficult to maintain. The application of the automatic driving technology and the assistant driving technology in a mid-low end vehicle is limited due to the shortcomings of the two sensors. A binocular stereo camera is provided so as to just meet this kind of requirement. The binocular stereo camera has all functions of a monocular camera, it may output point cloud data with quality better than the millimeter-wave radar and an accuracy level slightly less than the laser radar, so it is able to directly replace, or back up in terms of functional safety, point cloud data from the redundant millimeter-wave radar and the laser radar. The point cloud data from the binocular stereo camera corresponds to pixels of an image, so it is able to sense the non-metal obstacle and any other non-standard obstacles. The binocular stereo camera is mounted in a front windshield, so there is no mechanical loss, and it is easy for maintenance. In addition, in terms of the total cost, the binocular stereo camera merely has one additional camera module as compared with the monocular camera, and its price performance is advantageous over a scheme consisting of the monocular camera and the millimeter-wave radar. Functions of two sensors are capable of being achieved through merely one sensor, so this scheme is extremely advantageous.

For a short-distance target, the point cloud data generated by the binocular stereo camera is relatively accurate, and a detection effect is close to that of the laser radar. However, for a super-long-distance (more than 100 m) target, the point cloud data generated by the binocular stereo camera is significantly less accurate than that of the laser radar, so it is difficult to sense a super-long-distance obstacle. In actual use, due to the limit of a baseline length and a pixel size of an existing mainstream camera, it is almost impossible for the binocular stereo camera to output the point cloud data about the obstacle at a distance of more than 100 m.

Hence, there is an urgent need to provide a method and a system for detecting a long-distance target through a binocular camera, and an intelligent terminal, so as to provide the binocular stereo camera with an algorithm for sensing a long-distance obstacle, thereby to reduce the cost of an assistant driving system, and facilitate the popularization of the assistant driving technology in the mid-low end vehicles.

SUMMARY

An object of the present disclosure is to provide a method and a system for detecting a long-distance target through a binocular camera, and an intelligent terminal, so as to provide the binocular stereo camera with an algorithm for sensing a long-distance obstacle, thereby to reduce the cost of an assistant driving system, and facilitate the popularization of the assistant driving technology in the mid-low end vehicles.

In one aspect, the present disclosure provides in some embodiments a method for detecting a long-distance target through a binocular camera, including: acquiring original images generated by the binocular camera at a target region, acquiring a disparity map in accordance with the original images, and converting the disparity map into a space information point cloud map; partitioning a predetermined target detection range into a plurality of sub-ranges in accordance with the space information point cloud map, and acquiring a disparity threshold segmentation image for each sub-range; calculating an integral image in accordance with each disparity threshold segmentation image, and acquiring a heatmap of an obstacle in accordance with the integral images; and reversely mapping a maximum matching region in the heatmap to the original image, so as to acquire a target Region of Interest (ROI) for the obstacle, thereby to acquire a position of the obstacle.

In a possible embodiment of the present disclosure, the partitioning the predetermined target detection range into the plurality of sub-ranges in accordance with the space information point cloud map and acquiring the disparity threshold segmentation image for each sub-range includes: partitioning the predetermined target detection range from 100 m to 200 m into 10 sub-ranges each with a width of 10 m; and acquiring the disparity threshold segmentation image for each sub-range, and acquiring a binary image.

In a possible embodiment of the present disclosure, the calculating the integral image in accordance with each disparity threshold segmentation image includes calculating the integral image on the binary image corresponding to each sub-range, and a sum of values in a rectangular ROI on the integral image corresponding to each sub-range is calculated through sum(ROI)=D−B−C+A, where ROI represents the rectangular region of interest, and A, B, C and D represent four vertices of the rectangular ROI.

In a possible embodiment of the present disclosure, the acquiring the heatmap of the obstacle in accordance with the integral images includes: calling a pre-stored learning template in accordance with a type of the to-be-detected obstacle; sliding the learning template on the generated integral image; and acquiring the maximum matching region for the learning template on the integral image within a predetermined range in accordance with a matching level.

In a possible embodiment of the present disclosure, the acquiring the heatmap of the obstacle in accordance with the integral image includes: calculating the heatmap of the obstacle in accordance with the integral image and current driving data of a vehicle; reversely mapping the maximum matching region in the heatmap to the original image, to acquire a plurality of target ROIs of the obstacle overlapping each other; and fusing the target ROIs using a non-maximum suppression method, so as to acquire a unique target ROI of the obstacle.

In a possible embodiment of the present disclosure, the method further includes calculating a real size of the obstacle on the target ROI in accordance with the disparity map and a binocular camera model.

In a possible embodiment of the present disclosure, the real size of the obstacle is calculated through acquiring three-dimension information about each of an upper left pixel and a lower right pixel in the target ROI through $$x = \text{baseline} \cdot \frac{u - cx}{\text{disparity}},$$
$$y = \text{baseline} \cdot \frac{v - cy}{\text{disparity}} \text{ and}$$
$$z = \frac{\text{baseline} \cdot \text{focus}}{\text{disparity}},$$

where x, y and z represent coordinates of a point in a world coordinate system, u and v represents coordinates of a pixel in the image, baseline represents a baseline length of the binocular camera, focus represents a focal length of the binocular camera, disparity represents a disparity value at a pixel (u,v) in the image, and cx and cy represent coordinates of an optical center of a calibrated image.

In another aspect, the present disclosure provides in some embodiments a system for detecting a long-distance target through a binocular camera, including: a disparity acquisition and conversion unit configured to acquire original images generated by the binocular camera at a target region, acquire a disparity map in accordance with the original images, and convert the disparity map into a space information point cloud map; a disparity threshold partitioning unit configured to partition a predetermined target detection range into a plurality of sub-ranges in accordance with the space information point cloud map, and acquire a disparity threshold segmentation image for each sub-range; a heatmap acquisition unit configured to calculate an integral image in accordance with each disparity threshold segmentation image, and acquire a heatmap of an obstacle in accordance with the integral images; and an obstacle position acquisition unit configured to reversely map a maximum matching region in the heatmap to the original image, so as to acquire a target ROI for the obstacle, thereby to acquire a position of the obstacle.

In yet another aspect, the present disclosure provides in some embodiments an intelligent terminal, including a data collection unit, a processor and a memory. The data collection unit is configured to collected data, the memory is configured to store therein one or more program instructions, and the processor is configured to execute the one or more program instructions to implement the above-mentioned method.

In still yet another aspect, the present disclosure provides in some embodiments a computer-readable storage medium storing therein one or more program instructions. The one or more program instructions is executed by a processor so as to implement the above-mentioned method.

According to the method in the embodiments of the present disclosure, the original images generated by the binocular camera are acquired at a target region, and the disparity map is acquired in accordance with the original images and converted into the space information point cloud map. The predetermined target detection range is partitioned into the plurality of sub-ranges in accordance with the space information point cloud map, and the disparity threshold segmentation image is acquired for each sub-range. The integral image is calculated in accordance with each disparity threshold segmentation image, and the heatmap of the obstacle is acquired in accordance with the integral images. The maximum matching region in the heatmap is reversely mapped to the original image, so as to acquire the target ROI for the obstacle, thereby to acquire the position of the obstacle. The heatmap of the obstacle is acquired with respect to each sub-range of the disparity map and each target type, and then the heatmap is reversely mapped to the original image for further processing, so as to determine the obstacle. As a result, it is able to solve the problem in the related art where it is difficult to detect the obstacle at a long distance due to the inaccurate point cloud data acquired by the binocular stereo camera, thereby to provide a sensing scheme with high price performance for the automatic driving technology and the assistant driving technology. In addition, the binocular camera may detect the long-distance obstacle through an obstacle sensing algorithm without any necessity to provide various sensors, so it is able to reduce the cost of an assistant driving system, thereby to facilitate the popularization of the assistant driving technology in the mid-low end vehicles.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

The structure, scale and size shown in the drawings are merely provided to facilitate the understanding of the contents disclosed in the description but shall not be construed as limiting the scope of the present disclosure, so they has not substantial meanings technically. Any modification on the structure, any change to the scale or any adjustment on the size shall also fall within the scope of the present disclosure in the case of not influencing the effects and the purposes of the present disclosure.

DETAILED DESCRIPTION

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

Figure 1:
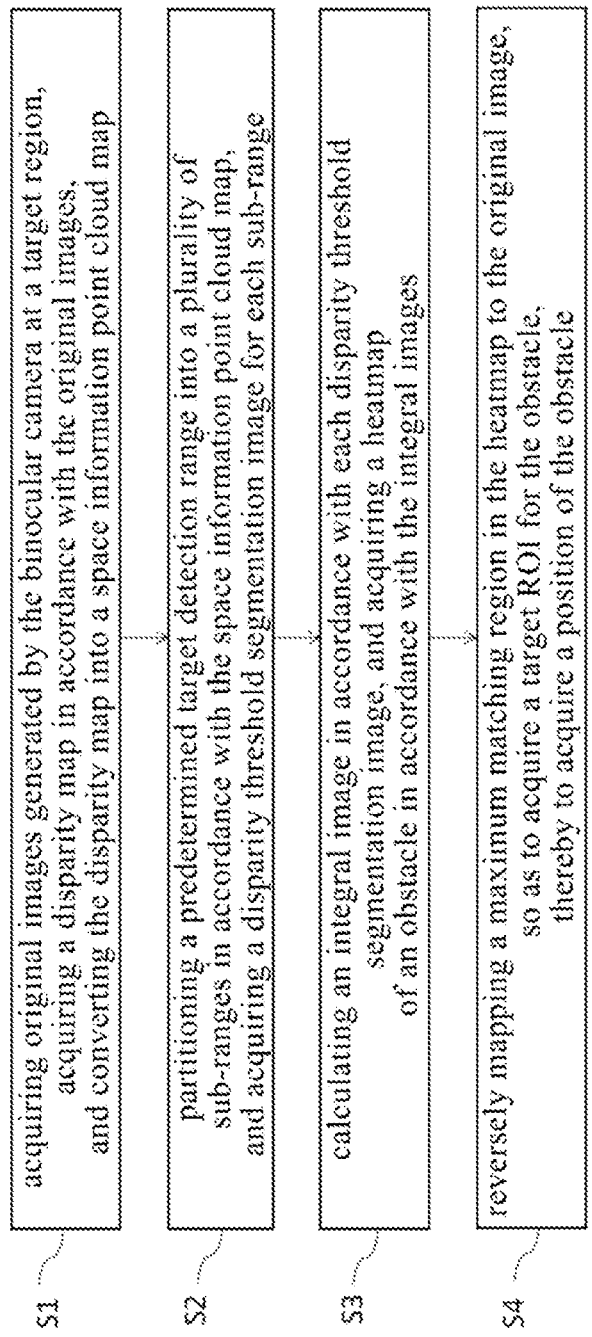
FIG. 1 is a flow chart of a method for detecting a long-distance target through a binocular camera according to one embodiment of the present disclosure.

The present disclosure provides in some embodiments a method for detecting a long-distance target through a binocular camera, which, as shown in FIG. 1, includes the following steps.

S1: acquiring original images generated by the binocular camera at a target region, acquiring a disparity map in accordance with the original images, and converting the disparity map into a space information point cloud map. To be specific, disparity values of points in a valid image region acquired by both a left-eye lens and a right-eye lens are calculated one by one through a calibrated image of the binocular camera, so as to acquire the disparity map corresponding to the calibrated image. The disparity values represent different distances, so it is able to convert the disparity map into the space information point cloud map.

S2: partitioning a predetermined target detection range into a plurality of sub-ranges in accordance with the space information point cloud map, and acquiring a disparity threshold segmentation image for each sub-range.

To be specific, in order to ensure the image acquisition accuracy, in a possible embodiment of the present disclosure, the predetermined target detection range is partitioned into sub-ranges with a same width. The smaller the width, the higher the accuracy. Obviously, an appropriate width of each sub-range may be selected, so as to reduce the operation difficulty as possible. For example, the predetermined target detection range from 100 m to 200 m may be divided into 10 sub-ranges each with a width of 10 m, and the disparity threshold segmentation image for each sub-range may be acquired, and then a binary image for each sub-range may be acquired.

In a specific scenario, when there is a target vehicle, e.g., an obstacle, in front of a vehicle where the binocular camera is mounted by a distance of greater than 100 m, e.g., 150 m, each binary image may be acquired for valid disparity points at a region with a width of 10 m. For example, when a maximum target detection distance is 200 m, the target detection range may be divided into 10 sub-ranges, i.e., [100, 110), [110, 120), [120, 130), [130, 140), [140, 150), [150, 160), [160, 170), [170, 180), [180, 190) and [190, 200), and then the disparity threshold segmentation image for each sub-range may be acquired.

S3: calculating an integral image in accordance with each disparity threshold segmentation image, and acquiring a heatmap of an obstacle in accordance with the integral images.

S4: reversely mapping a maximum matching region in the heatmap to the original image, so as to acquire a target ROI for the obstacle, thereby to acquire a position of the obstacle.

The calculating the integral image in accordance with each disparity threshold segmentation image specifically includes: calculating the integral image on the binary image corresponding to each sub-range, a sum of values in a rectangular ROI on the integral image corresponding to each sub-range being calculated through sum(ROI)=D−B−C+A, where ROI represents the rectangular region of interest, and A, B, C and D represent four vertices of the rectangular ROI.

The acquiring the heatmap of the obstacle in accordance with the integral images specifically includes: calling a pre-stored learning template in accordance with a type of the to-be-detected obstacle; sliding the learning template on the generated integral image; acquiring the maximum matching region for the learning template on the integral image within a predetermined range in accordance with a matching level; calculating the heatmap of the obstacle in accordance with the integral image and current driving data of a vehicle; reversely mapping the maximum matching region in the heatmap to the original image, to acquire a plurality of target ROIs of the obstacle overlapping each other; and fusing the target ROIs using a non-maximum suppression method, so as to acquire a unique target ROI of the obstacle.

Figure 2:
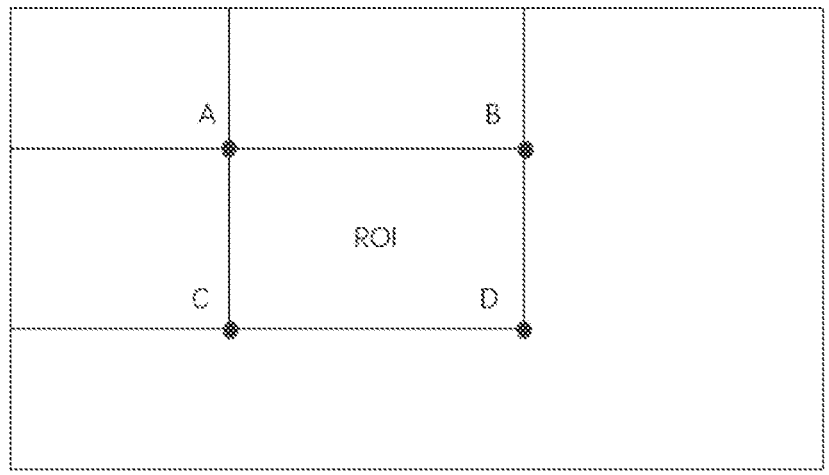
FIG. 2 is a schematic view showing the calculation of an integral image.

Still taking the above scenario as an example, when matching a shape of the obstacle, one binary image is acquired for each sub-range, and the integral image is calculated on the binary image (as shown in FIG. 2). A sum of all values within an upper left corner is stored at each pixel in the integral image. The sum of the values within one regular ROI in the image is calculated in accordance with the four vertices A, B, C and D in the integral image through sum(ROI)=D−B−C+A.

Figure 3:
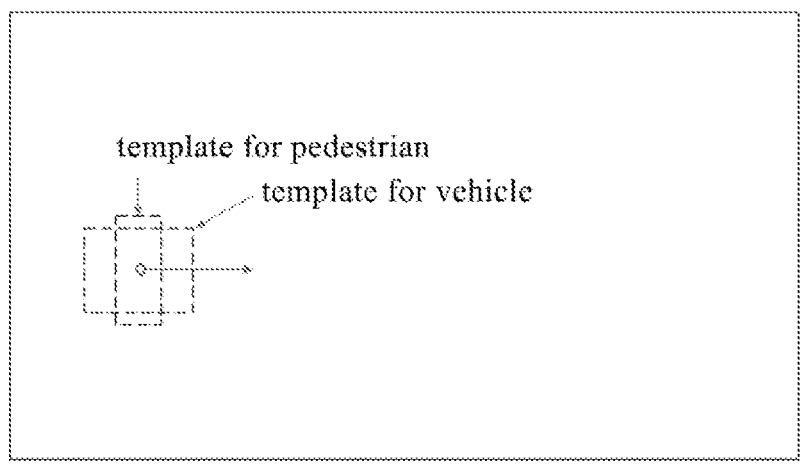
FIG. 3 is a schematic view showing a situation where a learning template is slid on an image according to one embodiment of the present disclosure.
Figure 4:
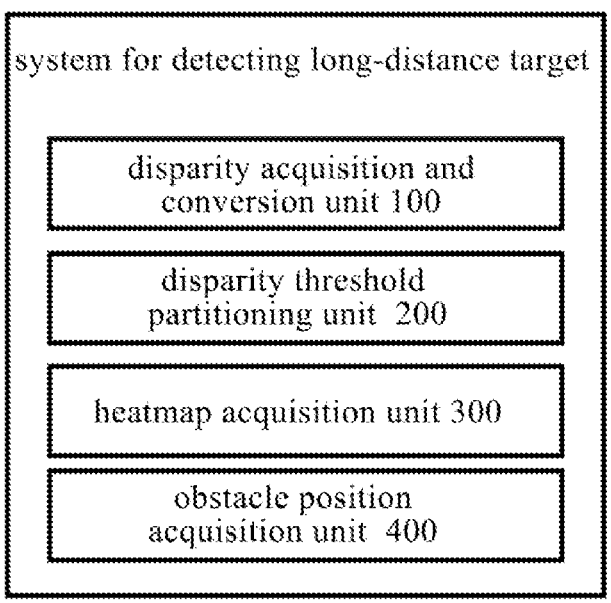
FIG. 4 is a block diagram of a system for detecting a long-distance target through a binocular camera according to one embodiment of the present disclosure.

The learning template for a to-be-detected target (e.g., pedestrian or vehicle) is slid on the image (as shown in FIG. 3). The matching level is calculated through the above equation within an ROI of the template, so as to acquire a maximum possible position of the target on the integral image. The heatmap may be acquired in accordance with the integral image as well as the vehicle (in a specific heatmap, red represents a high probability and blue represents a low probability). At this time, a reddest portion in the heatmap is just the position of the obstacle. The heatmap for the reddest portion is reversely mapped to the original image, so as to acquire a plurality of target ROIs of the obstacle overlapping each other. Then, the ROIs are fused using a non-maximum suppression method, so as to acquire a unique target ROI of the obstacle.

Apart from determining the position of the obstacle, in order to acquire more information about the obstacle, the method further includes calculating a real size of the obstacle on the target ROI in accordance with the disparity map and a binocular camera model.

To be specific, the real size of the obstacle is calculated through acquiring three-dimension information about each of an upper left pixel and a lower right pixel in the target ROI through $$x = \text{baseline} \cdot \frac{u - cx}{\text{disparity}},$$
$$y = \text{baseline} \cdot \frac{v - cy}{\text{disparity}} \text{ and}$$
$$z = \frac{\text{baseline} \cdot \text{focus}}{\text{disparity}},$$

where x, y and z represent coordinates of a point in a world coordinate system, u and v represents coordinates of a pixel in the image, baseline represents a baseline length of the binocular camera, focus represents a focal length of the binocular camera, disparity represents a disparity value at a pixel (u, v) in the image, and cx and cy represent coordinates of an optical center for calibrating the image.

According to the method in the embodiments of the present disclosure, the original images generated by the binocular camera are acquired at a target region, and the disparity map is acquired in accordance with the original images and converted into the space information point cloud map. The predetermined target detection range is partitioned into the plurality of sub-ranges in accordance with the space information point cloud map, and the disparity threshold segmentation image is acquired for each sub-range. The integral image is calculated in accordance with each disparity threshold segmentation image, and the heatmap of the obstacle is acquired in accordance with the integral images. The maximum matching region in the heatmap is reversely mapped to the original image, so as to acquire the target ROI for the obstacle, thereby to acquire the position of the obstacle. The heatmap of the obstacle is acquired with respect to each sub-range of the disparity map and each target type, and then the heatmap is reversely mapped to the original image for further processing, so as to determine the obstacle. As a result, it is able to solve the problem in the related art where it is difficult to detect the obstacle at a long distance due to the inaccurate point cloud data acquired by the binocular stereo camera, thereby to provide a sensing scheme with high price performance for the automatic driving technology and the assistant driving technology. In addition, the binocular camera may detect the long-distance obstacle through an obstacle sensing algorithm without any necessity to provide various sensors, so it is able to reduce the cost of an assistant driving system, thereby to facilitate the popularization of the assistant driving technology in the mid-low end vehicles.

The present disclosure further provides in some embodiments a system for detecting a long-distance target through a binocular camera, including: a disparity acquisition and conversion unit 100 configured to acquire original images generated by the binocular camera at a target region, acquire a disparity map in accordance with the original images, and convert the disparity map into a space information point cloud map; a disparity threshold partitioning unit 200 configured to partition a predetermined target detection range into a plurality of sub-ranges in accordance with the space information point cloud map, and acquire a disparity threshold segmentation image for each sub-range; a heatmap acquisition unit 300 configured to calculate an integral image in accordance with each disparity threshold segmentation image, and acquire a heatmap of an obstacle in accordance with the integral images; and an obstacle position acquisition unit 400 configured to reversely map a maximum matching region in the heatmap to the original image, so as to acquire a target ROI for the obstacle, thereby to acquire a position of the obstacle.

To be specific, disparity values of points in a valid image region acquired by both a left-eye lens and a right-eye lens are calculated one by one through a calibrated image of the binocular camera, so as to acquire the disparity map corresponding to the calibrated image. The disparity values represent different distances, so it is able to convert the disparity map into the space information point cloud map.

To be specific, in order to ensure the image acquisition accuracy, in a possible embodiment of the present disclosure, the predetermined target detection range is partitioned into sub-ranges with a same width. The smaller the width, the higher the accuracy. Obviously, an appropriate width of each sub-range may be selected, so as to reduce the operation difficulty as possible. For example, the predetermined target detection range from 100 m to 200 m may be divided into 10 sub-ranges each with a width of 10 m, and the disparity threshold segmentation image for each sub-range may be acquired, and then a binary image for each sub-range may be acquired.

In a specific scenario, when there is a target vehicle, e.g., an obstacle, in front of a vehicle where the binocular camera is mounted by a distance of greater than 100 m, e.g., 150 m, each binary image may be acquired for valid disparity points at a region with a width of 10 m. For example, when a maximum target detection distance is 200 m, the target detection range may be divided into 10 sub-ranges, i.e., [100, 110), [110, 120), [120, 130), [130, 140), [140, 150), [150, 160), [160, 170), [170, 180), [180, 190) and [190, 200), and then the disparity threshold segmentation image for each sub-range may be acquired.

According to the system in the embodiments of the present disclosure, the original images generated by the binocular camera are acquired at a target region, and the disparity map is acquired in accordance with the original images and converted into the space information point cloud map. The predetermined target detection range is partitioned into the plurality of sub-ranges in accordance with the space information point cloud map, and the disparity threshold segmentation image is acquired for each sub-range. The integral image is calculated in accordance with each disparity threshold segmentation image, and the heatmap of the obstacle is acquired in accordance with the integral images. The maximum matching region in the heatmap is reversely mapped to the original image, so as to acquire the target ROI for the obstacle, thereby to acquire the position of the obstacle. The heatmap of the obstacle is acquired with respect to each sub-range of the disparity map and each target type, and then the heatmap is reversely mapped to the original image for further processing, so as to determine the obstacle. As a result, it is able to solve the problem in the related art where it is difficult to detect the obstacle at a long distance due to the inaccurate point cloud data acquired by the binocular stereo camera, thereby to provide a sensing scheme with high price performance for the automatic driving technology and the assistant driving technology. In addition, the binocular camera may detect the long-distance obstacle through an obstacle sensing algorithm without any necessity to provide various sensors, so it is able to reduce the cost of an assistant driving system, thereby to facilitate the popularization of the assistant driving technology in the mid-low end vehicles.

The present disclosure further provides in some embodiments an intelligent terminal, including a data collection unit, a processor and a memory. The data collection unit is configured to collected data, the memory is configured to store therein one or more program instructions, and the processor is configured to execute the one or more program instructions to implement the above-mentioned method.

The present disclosure further provides in some embodiments a computer-readable storage medium storing therein one or more program instructions. The one or more program instructions is executed by a processor so as to implement the above-mentioned method.

In the embodiments of the present disclosure, the processor may be an integrated circuit (IC) having a signal processing capability. The processor may be a general-purpose processor, a Digital Signal Processor (DSP), an Application Specific Integrated Circuit (ASIC), a Field Programmable Gate Array (FPGA) or any other programmable logic element, discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as a Random Access Memory (RAM), a flash memory, a Read-Only Memory (ROM), a Programmable ROM (PROM), an Electrically Erasable PROM (EEPROM), or a register. The processor may read information stored in the storage medium so as to implement the steps of the method in conjunction with the hardware.

The storage medium may be a memory, e.g., a volatile, a nonvolatile memory, or both.

The nonvolatile memory may be an ROM, a PROM, an EPROM, an EEPROM or a flash disk.

The volatile memory may be an RAM which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM).

The storage medium in the embodiments of the present disclosure intends to include, but not limited to, the above-mentioned and any other appropriate memories.

It should be appreciated that, in one or more examples, the functions mentioned in the embodiments of the present disclosure may be achieved through hardware in conjunction with software. For the implementation, the corresponding functions may be stored in a computer-readable medium, or may be transmitted as one or more instructions on the computer-readable medium. The computer-readable medium may include a computer-readable storage medium and a communication medium. The communication medium may include any medium capable of transmitting a computer program from one place to another place. The storage medium may be any available medium capable of being accessed by a general-purpose or special-purpose computer.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for detecting a target through a binocular camera, comprising:
   S1, acquiring a plurality of original images generated by the binocular camera at a target region, acquiring a disparity map in accordance with the plurality of original images, and converting the disparity map into a space information point cloud map;
   S2, partitioning a predetermined target detection range into a plurality of sub-ranges in accordance with the space information point cloud map, and acquiring a disparity threshold segmentation image for each sub-range;
   S3, calculating an integral image in accordance with each disparity threshold segmentation image, and acquiring a heatmap of an obstacle in accordance with the integral images; and
   S4, reversely mapping a maximum matching region in the heatmap to the original image, so as to acquire a target Region of Interest (ROI) for the obstacle, thereby to acquire a position of the obstacle,
   wherein S2 comprises:
   partitioning the predetermined target detection range from 100 m to 200 m into 10 sub-ranges, each having a depth of 10 m, and
   acquiring a binary image as the disparity threshold segmentation image for each sub-range.

2. The method according to claim 1, wherein, in S3, the calculating the integral image in accordance with each disparity threshold segmentation image comprises calculating the integral image on the binary image corresponding to each sub-range, and a sum of values in a rectangular ROI on the integral image corresponding to each sub-range is calculated according to sum (ROI)=D−B−C+A, wherein ROI represents the rectangular region of interest, and A, B, C and D represent four vertices of the rectangular ROI, respectively.

3. A system for detecting a long-distance target through a binocular camera, for implementing the method according to claim 1, comprising:
   a disparity acquisition and conversion unit configured to acquire original images generated by the binocular camera at a target region, acquire a disparity map in accordance with the original images, and convert the disparity map into a space information point cloud map;
   a disparity threshold partitioning unit configured to partition a predetermined target detection range into a plurality of sub-ranges in accordance with the space information point cloud map, and acquire a disparity threshold segmentation image for each sub-range;
   a heatmap acquisition unit configured to calculate an integral image in accordance with each disparity threshold segmentation image, and acquire a heatmap of an obstacle in accordance with the integral images; and
   an obstacle position acquisition unit configured to reversely map a maximum matching region in the heatmap to the original image, so as to acquire a target ROI for the obstacle, thereby to acquire a position of the obstacle.

4. An intelligent terminal, comprising a data collection unit, a processor and a memory, wherein the data collection unit is configured to collected data, the memory is configured to store therein one or more program instructions, and the processor is configured to execute the one or more program instructions to implement the method according to claim 1.

5. A non-transitory computer-readable storage medium storing therein one or more program instructions, wherein the one or more program instructions is executed by a processor so as to implement the method according to claim 1.

6. The method according to claim 2, wherein, in S3, the acquiring the heatmap of the obstacle in accordance with the integral images comprises:
   calling a pre-stored learning template in accordance with a type of the to-be-detected obstacle;
   sliding the learning template on the generated integral image; and
   acquiring the maximum matching region for the learning template on the integral image within a predetermined range in accordance with a matching level, wherein the heatmap of the obstacle corresponds to the integral image and current driving data of a vehicle.

7. The method according to claim 6, wherein S4 comprises:
   reversely mapping the maximum matching region in the heatmap to the original image, to acquire a plurality of target ROIs of the obstacle that overlap; and
   fusing the plurality of target ROIs using a non-maximum suppression method, so as to acquire a unique target ROI of the obstacle.

8. The method according to claim 7, further comprising calculating a real size of the obstacle on the target ROI in accordance with the disparity map and a binocular camera model.

9. The method according to claim 8, wherein the real size of the obstacle is calculated through acquiring three-dimension information about each of an upper left pixel and a lower right pixel in the target ROI through $$x = \text{baseline} \cdot \frac{u - cx}{\text{disparity}},$$

$$y = \text{baseline} \cdot \frac{v - cy}{\text{disparity}} \text{ and}$$

$$z = \frac{\text{baseline} \cdot \text{focus}}{\text{disparity}},$$

wherein x, y and z represent coordinates of a point in a world coordinate system, disparity u and v represents coordinates of a pixel in the image, baseline represents a baseline length of the binocular camera, focus represents a focal length of the binocular camera, disparity represents a disparity value at a pixel (u,_v) in the image, and cx and cy represent coordinates of an optical center of a calibrated image.

* * * * *